United States Patent
Komatsu et al.

[11] Patent Number: 6,104,163
[45] Date of Patent: Aug. 15, 2000

[54] BATTERY CHARGING SYSTEM AND INFORMATION PROCESSING APPARATUS WITH REDUCED POWER CONSUMPTION AT CHARGES

[75] Inventors: Masayuki Komatsu; Satoshi Kizawa, both of Tokyo, Japan

[73] Assignee: Mitsubishi Denki Kabushiki Kaisha, Tokyo, Japan

[21] Appl. No.: 09/342,248

[22] Filed: Jun. 29, 1999

[30] Foreign Application Priority Data

Sep. 1, 1998 [JP] Japan .................................. 10-246854

[51] Int. Cl.$^7$ ................................. H02J 7/00; H02J 7/14
[52] U.S. Cl. ............................ 320/116; 320/119; 320/124
[58] Field of Search ................................. 320/116, 119, 320/124

[56] References Cited

U.S. PATENT DOCUMENTS 5,541,489   7/1996   Dunstan .
5,818,200   10/1998   Cummings et al. .

FOREIGN PATENT DOCUMENTS 0 875 977   11/1998   European Pat. Off. .
5-72303   3/1993   Japan .
10-23681   1/1998   Japan .

OTHER PUBLICATIONS

Smart Battery System Specifications, *"System Management Bus Specification"*, Nov. 18, 1998, Revision 1.08b.

*Primary Examiner*—Peter S. Wong
*Assistant Examiner*—Gregory J. Toatley
*Attorney, Agent, or Firm*—Burns, Doane, Swecker & Mathis, LLP

[57] ABSTRACT

The battery charging system allows a power consumption of an information processing apparatus to be maximally reduced when the system is off. When a charge request signal is output from a microprocessor of one battery, a connection control circuit puts one switch circuit into a open state and the other switch circuit into a closed state. As a result, a Smart Selector operates to start charging the battery whose connection has been detected. When the battery is fully charged and a full charge signal which is an inverted version of a charge request signal is output from the microprocessor, the connection control circuit operate to open the closed switch circuit and to close the opened switch circuit. The Smart Selector is made to recognize that the battery is no longer connected and detects only the other battery, thereby beginning charging to the other battery.

12 Claims, 3 Drawing Sheets

BATTERY CHARGING SYSTEM AND INFORMATION PROCESSING APPARATUS WITH REDUCED POWER CONSUMPTION AT CHARGES

BACKGROUND OF THE INVENTION

1. Field of the Invention

This invention relates to a battery charging system for charging a battery pack connected to an information processing apparatus, and in particular to a Smart Battery system that reduces power consumed for charging when the information processing apparatus is powered off.

2. Description of Related Art

Portable information processing apparatuses such as notebook computers, which are made advantageously compact, are commonly carried outside the office and used on a train, in a car, or the like. For this reason, notebook computers usually have a charge type battery integrated therein, and may also have a battery provided externally so that the system can be used for a longer period.

At present, intelligent type batteries such as Smart Batteries have been developed. The Smart Battery, which is a charge type battery, includes a microprocessor. By programming the microprocessor, the Smart Battery can transmit information concerning a remaining capacity, a voltage, manufactured date or the like of the battery and different kinds of signals.

FIG. 3 shows a circuit structure of a Smart Battery system including two battery packs, which is supported in a conventional notebook computer. In FIG. 3, there are shown: a Smart Charger 3 for supplying power to charge the Smart Battery packs (hereinafter merely referred to as "battery", or "batteries") 1, 2; a Smart Selector 4 for switchably connecting the Smart Charger to either of the batteries 1 and 2; a host controller 5 for executing a switching control for the Smart Selector 4 to switch the batteries to be connected; and a separate regulator circuit 6 for supplying power from an AC supply or the batteries 1, 2 to the host controller 5. In FIG. 3, a section enclosed by a dashed line (including a CPU etc. 7 and a DC/DC converter 8) contains elements of the circuit in the information processing apparatus that are not relevant to the battery charge. The Smart Selector 4 is connected to each of the elements required for charging, namely the batteries 1, 2, the Smart Charger 3, and the host controller 5, via the System Management Bus (SMBus (Trademark)) provided by Intel. Co., and is controlled through an SMBus interface. The aforementioned data including information concerning the remaining capacity of the battery or the like is transmitted or received via the SMBus. Further, the Smart Selector 4 includes a mechanism for detecting whether or not the batteries 1 and 2 are connected to the Smart Selector 4, and operates such that the Smart Charger 3 is connected to the battery whose connection state is detected to perform charging. In this case, when only one of the two batteries is connected (to the Smart Selector 4), the Smart Selector 4 can operate so that the connected battery is to be charged. However, when both batteries are connected simultaneously, the Smart Selector 4 must select any one of the batteries 1, 2 in accordance with an instruction from the host controller 5 and establish connection between the selected battery and the Smart Charger 3. For example, assume that the battery 1 is integrally mounted in the computer and the battery 2 is externally provided to the computer. In the Smart Battery system, the integrated battery 1 is usually first charged and then charging of the external battery 2 begins after the charging of battery 1 is completed.

Next, the operation at the time of charging the batteries 1 and 2 in the aforementioned structure will be described.

First, when the notebook computer is powered on (system on), the host controller 5 operates using power supplied via the DC/DC converter 8 which constitutes means for controlling a power supply to the computer body, and executes switching control of the Smart Selector 4 while checking the remaining capacity of the batteries 1 and 2.

When the notebook computer is switched off (system off), on the other hand, a power from the AC supply is not supplied to the computer body including the DC/DC converter 8 or the like, and therefore a power from the batteries 1 and 2, not from the DC/DC converter 8, is supplied to the host controller 5 and charging is performed as follows. First, under the control of the host controller 5, the Smart Selector 4 operates to connect the Smart Charger 3 to the integrated battery 1 of the two batteries 1 and 2 which are both in the connected state, thereby supplying power to the battery 1. The battery 1, when reaching a full-charged state, transmits a full charge signal indicating this state. The Smart Selector 4, which, by itself, is not able to switch the objects to which a power is supplied, executes such a switching operation for supplying a power under the control of the host controller 5. Accordingly, the full charge signal from the battery 1 is sent via the Smart Selector 4 to the host controller 5. The host controller 5, when detecting the full charge signal, issues a command to switch the objects to be connected with the Smart Charger 3 to the Smart Selector 4. Then, in response to the command from the host controller 5, the Smart Selector 4 switches the objects to be connected with the Smart Charger 3 into the battery 2 which is another battery whose connected state has been detected. In this way, charging of the battery 2 connected to the Smart Charger 3 will begin.

As described above, in the conventional Smart Battery system, a plurality of batteries 1, 2 are connected to the Smart Selector 4, and the host controller 5, when detecting a full charge signal issued by the battery reaching its full-charged state, executes switching control of the Smart Selector 4, thereby automatically switching the batteries to be charged.

However, in the foregoing conventional system, even when the system is off, power must continuously be supplied to the host controller, which, when detecting the full charge signal issued by the battery, executes a switching control of the Smart Selector which is not able to switch the connecting objects by itself.

Therefore, there are times when the battery capacity becomes inadequate, even though the computer has not been used for a long time after the completion of charge.

SUMMARY OF THE INVENTION

The present invention is made so as to solve the foregoing problem, and it is an object of the present invention to provide an information processing apparatus and a battery charging system of an information processing apparatus which allows power consumption to be reduced to a minimum when the system is off.

In order to attain the foregoing object, in accordance with one aspect of the present invention, there is provide a battery charging system, comprising a first battery pack including a processor for outputting a disconnection request signal, a second battery pack, a charging device for supplying a power to charge said battery packs, a switching device including a mechanism for detecting whether or not said battery packs are in a connected state and establishing a connection between either one of said battery packs whose connected state has been detected and said charging device, and a connection control circuit for disconnectably connecting a first connection terminal of said switching device with reference of which the connection state of said first battery pack is first detected by the said switching device with said first battery pack and for disconnectably connecting a second connection terminal of said switching device with reference of which the connection state of said second battery pack is detected by the switching device after detection concerning said first connection terminal with said second battery pack and for disconnecting said first battery pack connected with said switching device from said switching device when detecting said disconnection request signal from the processor which is included in said first battery pack, wherein the charging object is switched to said second battery pack by prohibiting said switching device from detecting said first battery pack.

Further, in accordance with another aspect of the present invention, there is provide a battery charging system comprising a charging device for supplying a power to charge battery packs, a first battery pack including a processor for outputting a charge request signal and a disconnection request signal, a switching device including a mechanism for detecting whether or not said first battery pack and a second battery pack are connected (to said switching device) and for connecting either one of said battery packs whose connected state has been detected with said charging device, and a connection control circuit for disconnectably connecting said switching device with said first battery pack and for disconnectably connecting said switching device with said second battery pack, wherein said connection control circuit connects said first battery pack with said switching device and disconnects said second battery pack from said switching device when a charge request signal outputted from the processor included in said first battery pack is detected, and disconnects said first battery pack from said switching device and connects said second battery pack with said switching device when a disconnection request signal outputted from the processor integrally mounted in said first battery pack is detected, and said switching device switches the objects to be connected with said charging device from said first battery pack which is now disconnected to said second battery pack and switches the objects to be connected with said charging device from said second battery pack which is now disconnected to said first battery pack.

Still further, according to another aspect of the present invention, there is provided a battery charging system comprising a charging device for supplying a power to charge battery packs, a first battery pack including a processor for outputting a disconnection request signal, a switching device for switching the connection with said charging device from said first battery pack to a second battery pack, and a connection control circuit for disconnectably connecting said switching circuit with said first battery pack, wherein said connection control circuit disconnects said first battery pack which has been connected with said switching device from the switching device when a disconnection request signal outputted from said processor is detected, and said switching device includes a mechanism for detecting whether or not said switching device and said first battery pack are connected, and switches the connection between said charging device and said battery packs on the basis of the detection result from said detecting mechanism.

Still further, according to yet another aspect of the present invention, there is provided an information processing apparatus comprising a first battery including a first processor, a switching device for switching the battery to be charged from said first battery to a second battery, and a main body including a second processor for controlling said first battery and power supply control means for controlling a power supply to said second processor, wherein said power supply control means supplies a power to said second processor when said main body is switched on and intercepts a power supply to said second processor when said main body is turned off, and said switching device switches the battery to be charged from said first battery to said second battery in response to a switch signal transmitted from said first processor.

According to the present invention, the first battery pack is disconnected from the switching device in response to a request from the first battery pack so as to make the switching device recognize that the first battery pack is not connected, whereby the charging object can be switched to the second battery pack. In the conventional art, the switching control of the charging objects at the time of system OFF is performed by a host controller which is continuously operated. According to the present invention having the foregoing feature, the host controller is not necessary when the system is off. This results in the elimination of a power supply to the host controller when the system is off, which further leads to a reduction of a power consumption when the system is off.

Also, since a power supply to the controller is not necessary when the system if off, a separate regulator circuit provided for supplying a power to the host controller can be also eliminated. This further promotes a reduction of manufacturing cost and miniaturization of a portable information processing apparatus.

BRIEF DESCRIPTION OF THE DRAWINGS

These and other objects of the invention will be explained in the description below, in connection with the accompanying drawings, in which.

DETAILED DESCRIPTION OF THE PREFERRED EMBODIMENT

A preferred embodiment of the present invention will be described in further detail with reference to the accompanying drawings.

Figure 1:
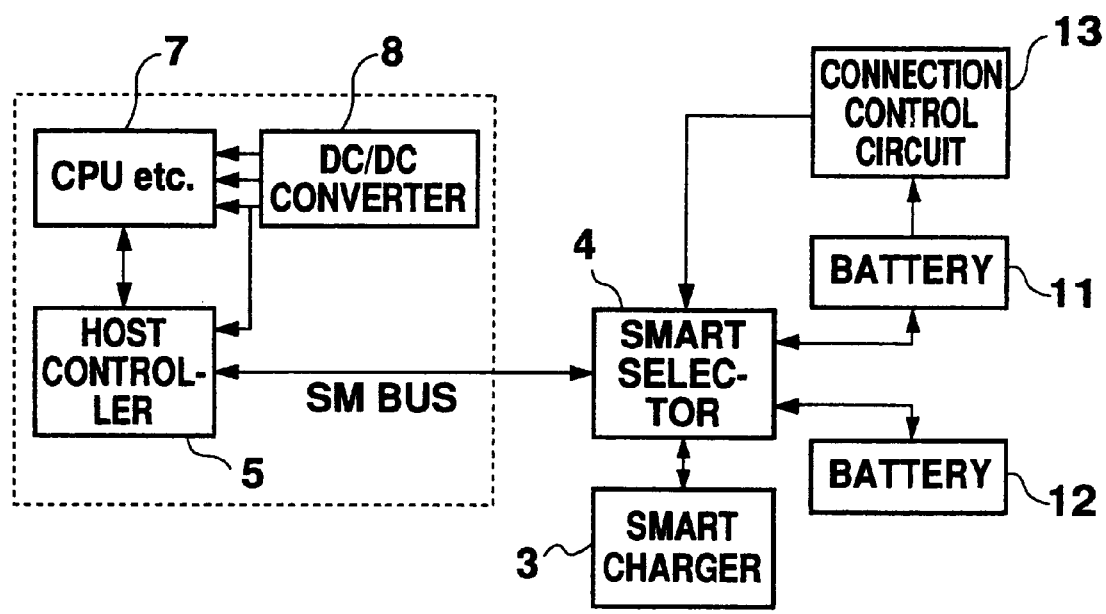
FIG. 1 shows a schematic circuit structure of a complete information processing apparatus including a battery charging system according to a first embodiment of the present invention.

FIG. 1 shows a schematic circuit structure of a complete information processing apparatus including a battery charging system according to one embodiment of the present invention. In FIG. 1, there are shown: two Smart Battery packs (herein after referred to as "batteries") 11, 12; a Smart Charger 3 which is a charging device for supplying a power to charge the batteries 11 and 12; a Smart Selector 4 which is a switching device having a mechanism for detecting the connection state of the batteries 11 and 12 and connecting the Smart Charger 3 to either one of the batteries 11, 12 whose connection is detected; and a connection control circuit 13 for executing connection control between the Smart Selector 4 and each of the batteries 11, 12. The Smart Charger 3 and the Smart Selector 4 used in this embodiment can be the same ones used in the prior art. Further, in the present embodiment, the battery 11 is of integral type and the battery 12 is of external type. In FIG. 1, elements which are encircled by a dashed line are not relevant to the battery charge in the information processing apparatus. As is clear from FIG. 1, the host controller 5, which is a second processor and was essential to a conventional battery charge, is not required in this embodiment. As a result, a separate regulator circuit for supplying a power to the host controller 5 also becomes unnecessary.

Figure 2:
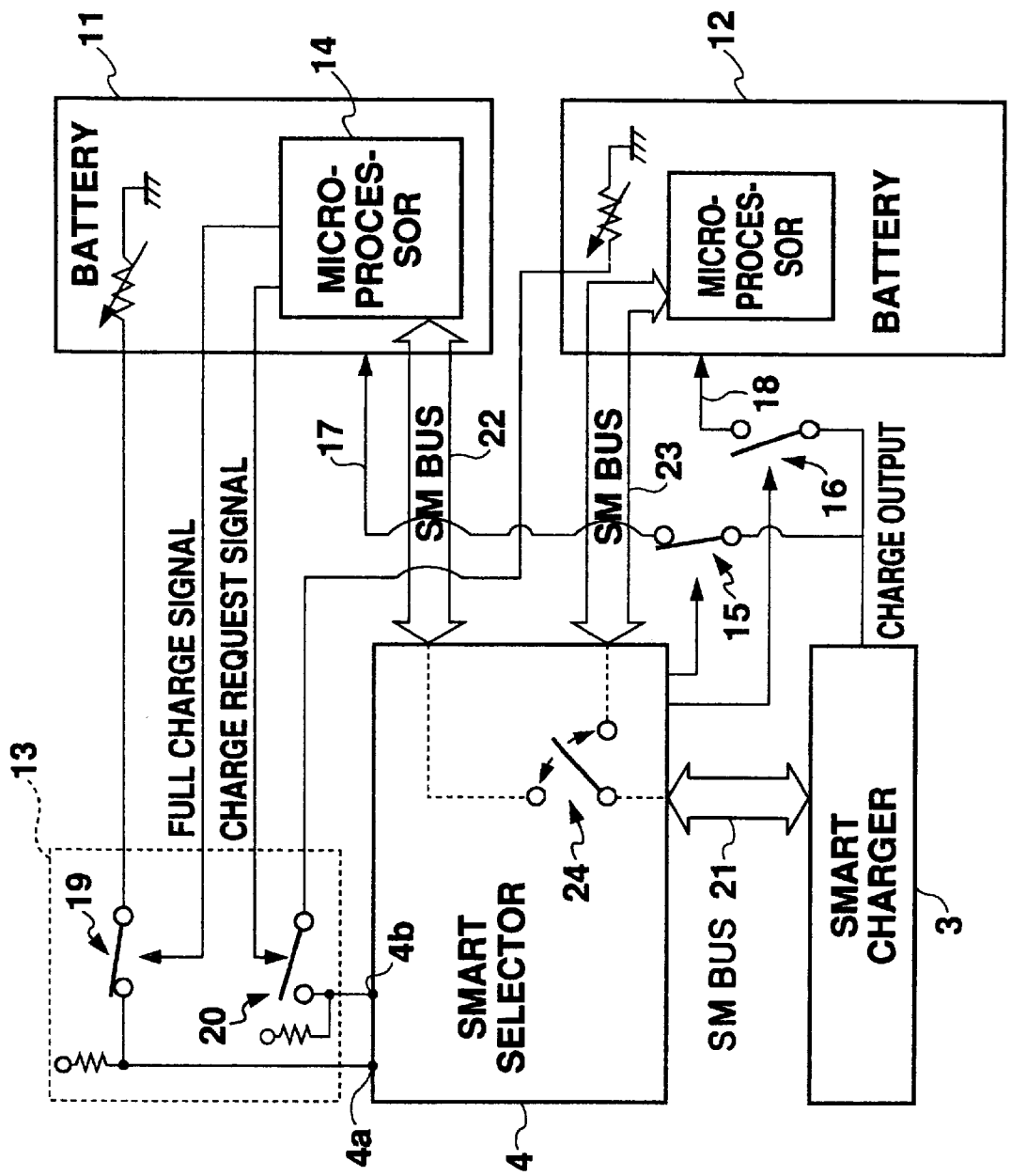
FIG. 2 shows a circuit structure of the battery charging system of FIG. 1.
Figure 3:
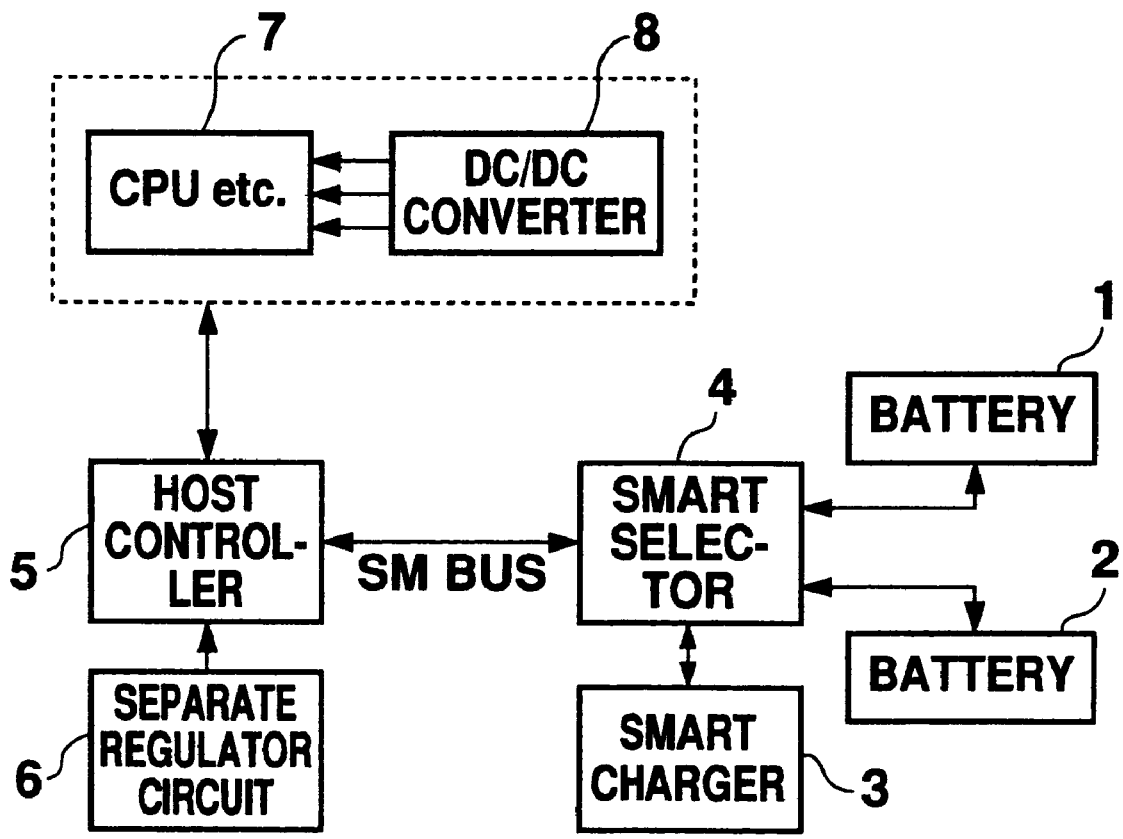
FIG. 3 shows a schematic circuit structure of a complete information processing apparatus including a conventional battery charging system.

FIG. 2 shows in more detail the circuit structure of the charging system for the Smart Battery pack shown in FIG. 1. The battery 11 includes a microprocessor 14 which is a first processor, and is set as an interface which outputs a charge request signal when requesting a charge and a disconnection request signal at its fully charged state. The disconnection request signal, which corresponds to a conventional full charge signal, is actually an inverted version of a charge request signal. Hereinafter, this disconnection request signal will be referred to as a full charge signal, as in the conventional art. The battery 12 has the same function as the battery 11 and includes a similar microprocessor. Therefore, the battery 12 also outputs a charge request signal when requesting a charge and a full charge signal at its fully charged state, and these output signals are supplied to the connection control circuit 13. However, such a structure of the battery 12 is not shown in FIG. 2 because it is not material to the explanation of the present embodiment. The batteries 11, 12 are connected to the Smart Charger 3 to obtain a power via power buses 17, 18, respectively, having respective switch circuits 15, 16 in the middle of the buses.

The connection control circuit 13 includes two switch circuits 19 and 20. The switch circuit 19 connects and disconnects the connection terminal 4a of the Smart Selector 4 with and from the battery 11, and operates to open when a full charge signal from the battery 11 is detected. Since the charge request signal and the full charge signal are inverted signals with respect to each other, the switch 19 operates to close when detecting a charge request signal and operates to open when detecting a full charge signal. The switch circuit 20 connects and disconnects the connection terminal 4b of the Smart Selector 4 with and from the battery 12, and operates to be opened when detecting a charge request signal from the battery 11. The switch 20 operates to open when detecting a charge request signal and operates to close when detecting a full charge signal. Namely, the switch circuits 19 and 20 operate in a completely opposite manner. The Smart Selector 4 connects the Smart Charger 3 to the battery 11 or 12 whose connection is detected. In the case where both batteries 11 and 12 are connected to the Smart Selector 4, the Smart Selector 4 connects the Smart Charger 3 with the battery whose connected state was first detected. If it is not known which of the batteries 11 and 12 is connected first, the connection of the connection terminal 4a with the battery is first determined. In the present embodiment, this connection terminal 4a is connected to the battery 11 which performs a switching control of the Smart Selector 4.

As described above, the Smart Selector 4 is provided with a mechanism for detecting whether or not each battery 11, 12 is connected. Specifically, the connected state of the battery 11 is actually detected by closing the switch circuit 19 and the connected state of the battery 12 is actually detected by closing the switch circuit 20. Further, the Smart Selector 4 is connected via the aforementioned SMBuses 21, 22, 23 which are standard buses in the Smart Battery system, with the Smart Charger 3 and the batteries 11 and 12, respectively. The Smart Selector 4 includes a switch circuit 24 which connects the SMBuses 21, 22 between the Smart Charger 3 and the battery 11 when detecting the connection of the battery 11, and connects the SMBuses 21, 23 between the Smart Charger 3 and the battery 12 when detecting the connection of the battery 12. The Smart Selector 4 further operates such that it closes the switch circuit 15 and opens the switch circuit 16 so as to supply a power only to the battery 11 when detecting the connection of the battery 11 while it closes the switch circuit 16 and opens the switch circuit 15 so as to supply a power only to the battery 12.

The feature of the present embodiment is that a switching of the batteries 11 and 12 to be charged can be performed only by controlling the connection thereof using a hardware-like circuit structure. Namely, the connection control circuit 13 of the present embodiment corresponds to the hardware-like circuit structure. According to this structure, the changeover of the object to be charged from the battery 11 to the battery 12 can be performed without operating the host controller, and therefore a power consumption at the time of system off can be reduced. Further, since a power supply to the host controller is not necessary when the system is off, a separate regulator circuit is also unnecessary. As a result, reduction of manufacturing cost and miniaturization of the apparatus can be further promoted.

The operation of the present embodiment will now be described. However, the operation at system on is the same as that in the previously described prior art and will not be repeated.

When charging of the integrated battery 11 is started as in the conventional art at the time of system off, the microprocessor 14 in the battery 11 outputs a charge request signal. In response to this charge request signal, the connection control circuit 13 opens the switch circuit 20. At the same time, the switch circuit 19 is closed since a full charge signal is not output. As a result, the Smart Selector 4 only detects the connected states of the battery 11. On detecting the connection of the battery 11, the Smart Selector 4 operates to close the switch circuit 15 and open the switch 16, whereby power from the Smart Charger 3 is supplied to the battery 11. Further, the Smart Selector 4 connects the switch circuit 24 at the side of the battery 11 to establish connection between the Smart Charger 3 and the battery 11 via the SMBuses 21 and 22. In this way, charging of the battery 11 is performed in accordance with the request from the battery 11.

The battery 11, when reaching a fully-charged state, outputs a full charge signal. The detection of the fully-charged state of the battery 11 and the output of the full charge signal is executed by the microprocessor 14. In response to the full charge signal outputted from the microprocessor 14, the connection control circuit 13 opens the switch circuit 19 and closes the switch circuit 20. As a result, the Smart Selector 4 which cannot detect the existence of the battery 11 is made to recognize that the battery 11 does not exist although it actually remain mounted in the apparatus, thereby detecting only the connection of the battery 12. Upon detecting the connection of the battery 12, the Smart Selector 4 causes the switch circuit 16 to close and the switch circuit 15 to open, whereby a power supply from the Smart Charger 3 is switched from the battery 11 to the battery 12. At the same time, switch circuit 24 is connected to the battery 12 side so as to establish a connection between the Smart Charger 3 and the battery 12 via the SMBuses 21 and 23. In this way, the object to be charged can be switched from the battery 11 to the battery 12 in accordance with an instruction from the battery 11.

As is clear from the aforementioned operation, the present embodiment is characterized in that, by disconnecting the battery 11 from the Smart Selector 4 when the battery 11 reaches a fully-charged state, the Smart Selector 4, which cannot control the switching of the charging objects by itself, is made to determine that the battery 11 is not connected to the Smart Selector 4. This simple operation of disconnection allows the charging object to be switched from the battery 11 to the battery 12. The Smart Selector 4 only attempts to supply power to the battery connected thereto, and does not operate to switch the objects to be charged in response to an external instruction. In the present embodiment, this behavior of the Smart Selector 4 is accomplished by prohibiting the Smart Selector 4 from detecting the connection of the battery 11.

As described, according to the present embodiment, since the switching control between the batteries 11 and 12 can be performed without using a host controller, a power consumption when the system is off can be reduced to a great degree. The switch circuits 19 and 20 of the connection control circuit 13 can be constituted simply by connecting diodes or transistors, and a power consumption thereof is very little compared to that of a host controller.

In a general-purpose type information processing apparatus such as a notebook computer, the state of being charged or completion of charging is often indicated by an indicator light or a change of display color. In the Smart Battery system, on the other hand, a charge request signal or a full charge signal output from the microprocessor 14 is used for such a display control of the indicator. In the foregoing embodiment, the charge request signal or the full charge signal is effectively utilized so as to control the switching between the charging objects, and, thus, no additional function is required for microprocessor 14 to control a signal output.

When charging of the battery 12 is completed, power supply to the battery 12 is terminated as in the conventional art. In the present embodiment, however, when power which has been stored in the battery 11 is later consumed by the apparatus, the microprocessor 14 in the battery 11 outputs a charge request signal and the charging to the battery 11 will be resumed according to the above described operation.

Further, in the present embodiment, the switch circuits 19 and 20 are controlled to be exclusively opened or closed. However, even if the batteries 11 and 12 are both in a connected state, only by connecting the battery 11 with the connection terminal 4a whose connection is first detected by the Smart Selector 4, switching control after the completion of charging to the battery 11 can be performed without providing the switch circuit 20. Specifically, if the switch circuit 19 is closed when charging is started at the time of system off, the Smart Selector 4 first detects the battery 11 and establishes a connection so as to start the charging of the battery 11. When the battery 11 is fully charged and the microprocessor 14 outputs a full charge signal, the switch circuit 19 is opened as in the foregoing operation. At this time, the Smart Selector 4 only detects the connection of the battery 12, and as a result, the charging object is switched from the battery 11 to the battery 12. In this manner, it is possible to switch the charging object by putting the switch circuit 19 in an open state when the battery 11 is fully charged to make the Smart Selector 14 recognize that the battery 11 is not connected.

Although an example where two smart batteries are used is described, the present invention is also applicable where three or more batteries are used. Also, although a Smart Battery was described as a battery pack which is integrally mounted in a processor, the present invention is also applicable to any batteries having the similar function. Further, although the example described a generally used notebook computer comprising the battery 11, the Smart Charger 3 and the Smart Selector 4, the present invention is also applicable to any apparatus having the aforementioned connection structure, whether a battery is integrally or externally mounted.

Further, although the example described that the time of requesting a charge is when the battery capacity is almost empty and that the time of being fully charged is when the battery capacity is full, as generally interpreted. It is also possible to fix the percentage of the batty capacity which is detected as an inadequate state or as a fully-charged state by setting the microprocessor in the Smart Battery.

Further, while in the description, a disconnection request signal corresponds to a full charge signal of a conventional art, the timing of transmitting this signal can also be fixed by setting the microprocessor in the Smart Battery.

While the preferred embodiment of the present invention has been described using specific terms, such description is for illustrative purposes only, and it is to be understood that changes and variations may be made without departing from the spirit or scope of the appended claims.

What is claimed is:

1. A battery charging system, comprising:
  a first battery pack including a processor for outputting a disconnection request signal;
  a second battery pack;
  a charging device for supplying a power to charge said battery packs;
  a switching device including a mechanism for detecting whether or not said battery packs are in a connected state and establishing a connection between either one of said battery packs whose connected state has been detected and said charging device; and
  a connection control circuit for disconnectably connecting a first connection terminal of said switching device with reference of which the connection state of said first battery pack is first detected by the said switching device with said first battery pack and for disconnectably connecting a second connection terminal of said switching device with reference of which the connection state of said second battery pack is detected by the switching device after detection concerning said first connection terminal with said second battery pack and for disconnecting said first battery pack connected with said switching device from said switching device when detecting said disconnection request signal from the processor which is integrally mounted in said first battery pack;
  wherein the charging object is switched to said second battery pack by prohibiting said switching device from detecting said first battery pack.

2. A battery charging system as defined in claim 1, wherein said first battery pack is an integral type and said second battery pack is an external type.

3. A battery charging system as defined in claim 1, wherein a signal output by said processor for indicating the completion of charging is used as said disconnection request signal.

4. A battery charging system comprising:
  a charging device for supplying a power to charge battery packs;

a first battery pack including a processor for outputting a charge request signal and a disconnection request signal;

a switching device including a mechanism for detecting whether or not said first battery pack and a second battery pack are connected to said switching device and for connecting either one of said battery packs whose connected state has been detected with said charging device; and a connection control circuit for disconnectably connecting said switching device with said first battery pack and for disconnectably connecting said switching device with said second battery pack;

wherein said connection control circuit connects said first battery pack with said switching device and disconnects said second battery pack from said switching device when a charge request signal output from the processor included in said first battery pack is detected, and disconnects said first battery pack from said switching device and connects said second battery pack with said switching device when a disconnection request signal output from the processor included in said first battery pack is detected, and said switching device switches the object to be connected with said charging device from said first battery pack which is now disconnected to said second battery pack and switches the object to be connected with said charging device from said second battery pack which is now disconnected to said first battery pack.

5. A battery charging system as defined in claim 2, wherein said first battery pack is an integral type and said second battery pack is an external type.

6. A battery charging system as defined in claim 2, wherein a signal output by said processor for indicating the completion of charging is used as said disconnection request signal.

7. A battery charging system as defined in claim 2, wherein a signal output by said processor for indicating the completion of charging is used as said disconnection request signal and a signal outputted by said processor for indicating that charging is being performed is used as said charge request signal.

8. A battery charging system comprising:

a charging device for supplying a power to charge battery packs;

a first battery pack including a processor for outputting a disconnection request signal;

a switching device for switching the connection with said charging device from said first battery pack to a second battery pack; and a connection control circuit for disconnectably connecting said switching circuit with said first battery pack, wherein said connection control circuit disconnects said first battery pack which has been connected with said switching device from the switching device when a disconnection request signal output from said processor is detected, and said switching device includes a mechanism for detecting whether or not said switching device and said first battery pack are connected, and switches the connection between said charging device and said battery packs on the basis of the detection result from said detecting mechanism.

9. A battery charging system as defined in claim 3, wherein said first battery pack is an integral type and said second battery pack is an external type.

10. A battery charging system as defined in claim 3, wherein a signal output by said processor for indicating the completion of charging is used as said disconnection request signal.

11. An information processing apparatus comprising:

a first battery including a first processor;

a switching device for switching the battery to be charged from said first battery to a second battery; and a main body including a second processor for controlling said first battery and power supply control means for controlling a power supply to said second processor, wherein said power supply control means supplies a power to said second processor when said main body is switched on and intercepts a power supply to said second processor when said main body is turned off, and said switching device switches the battery to be charged from said first battery to said second battery in response to a switch signal transmitted from said first processor.

12. An information processing apparatus as defined in claim 11, wherein a signal output from said first processor for changing the indication of an indicator so as to represent the state of being charged or the completion of charge is used as said switch signal.

* * * * *